Feb. 3, 1959  E. W. GREMP  2,871,730
PORTABLE DRILL PRESS
Filed Aug. 31, 1955  5 Sheets-Sheet 1

INVENTOR.
Eugene W. Gremp,
BY
Cromwell, Greist-Warden
Attys

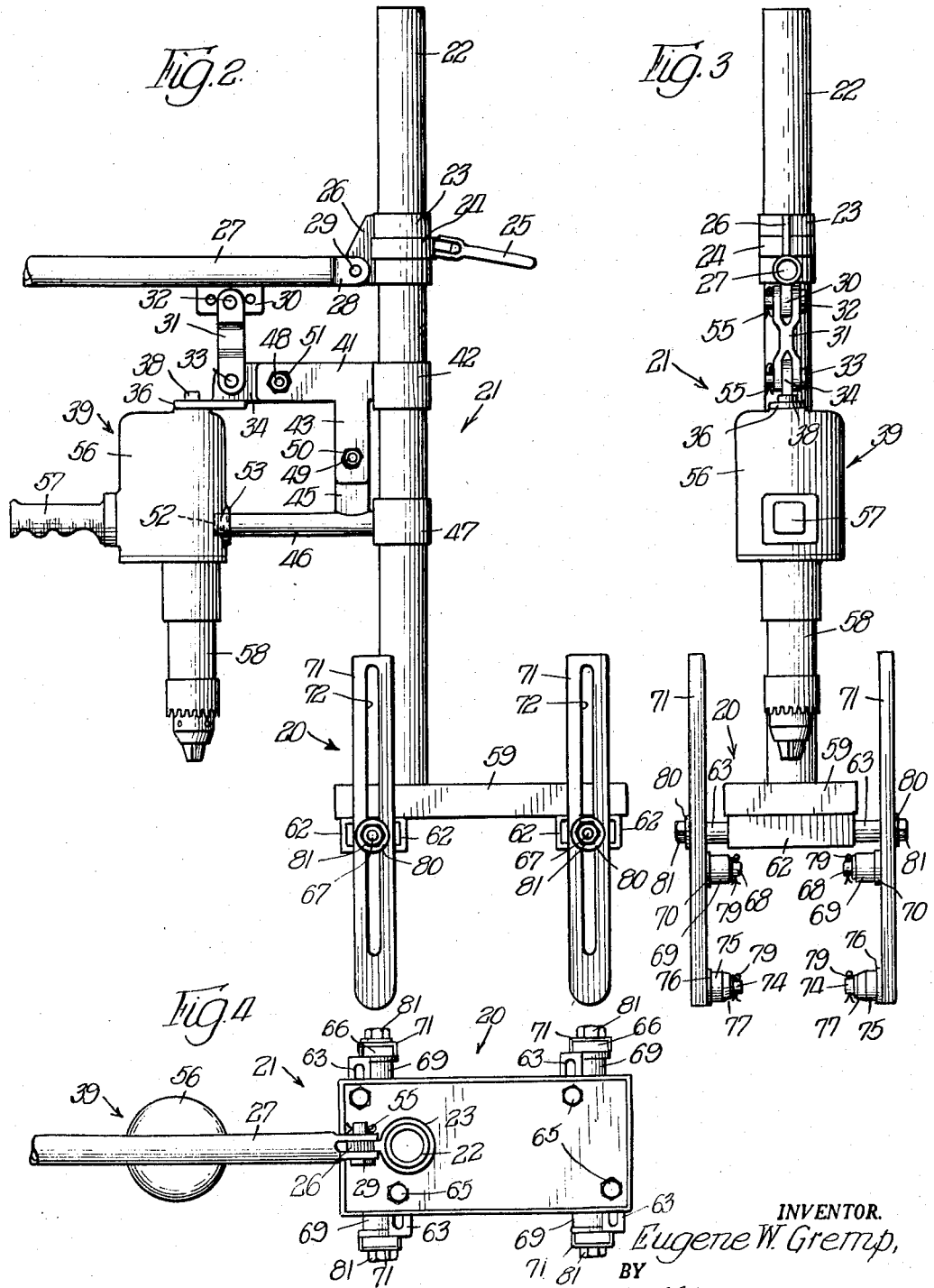

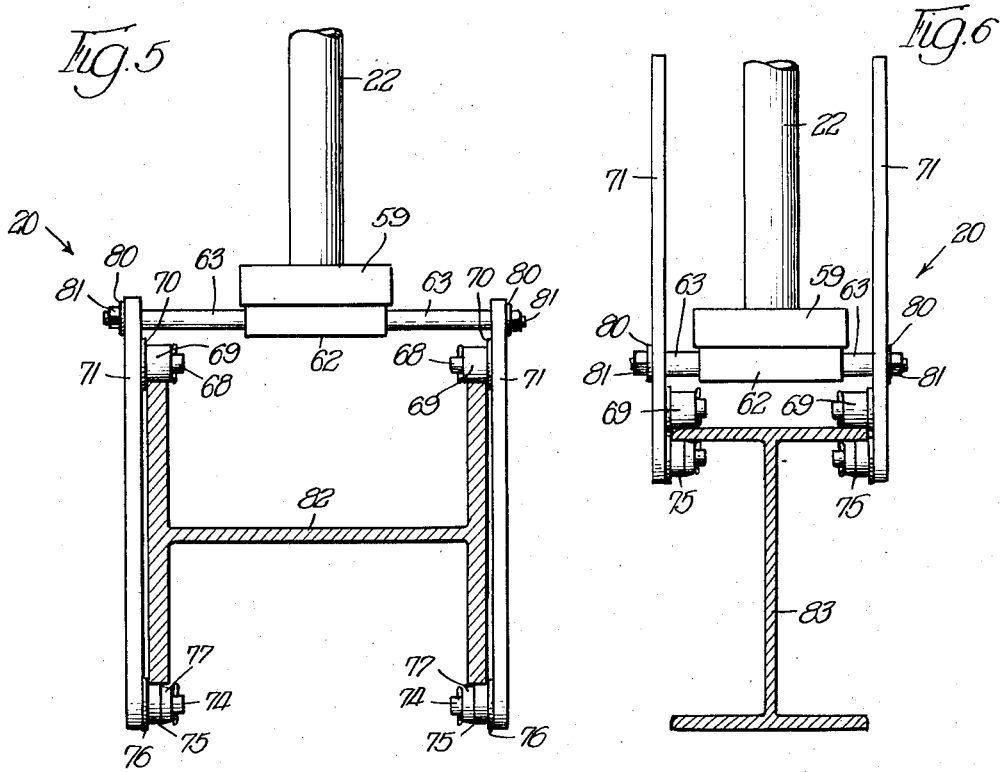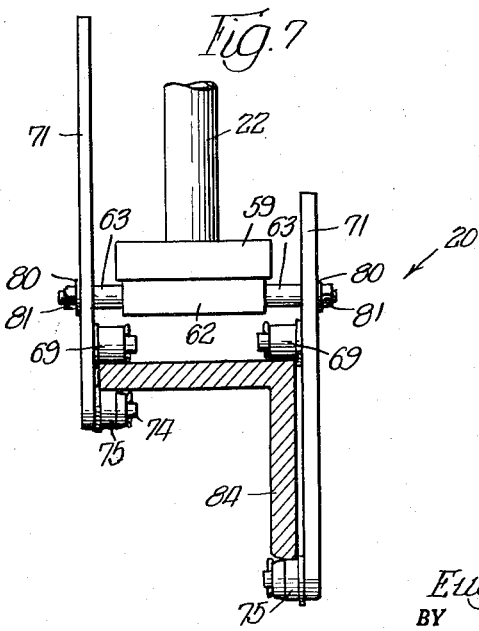

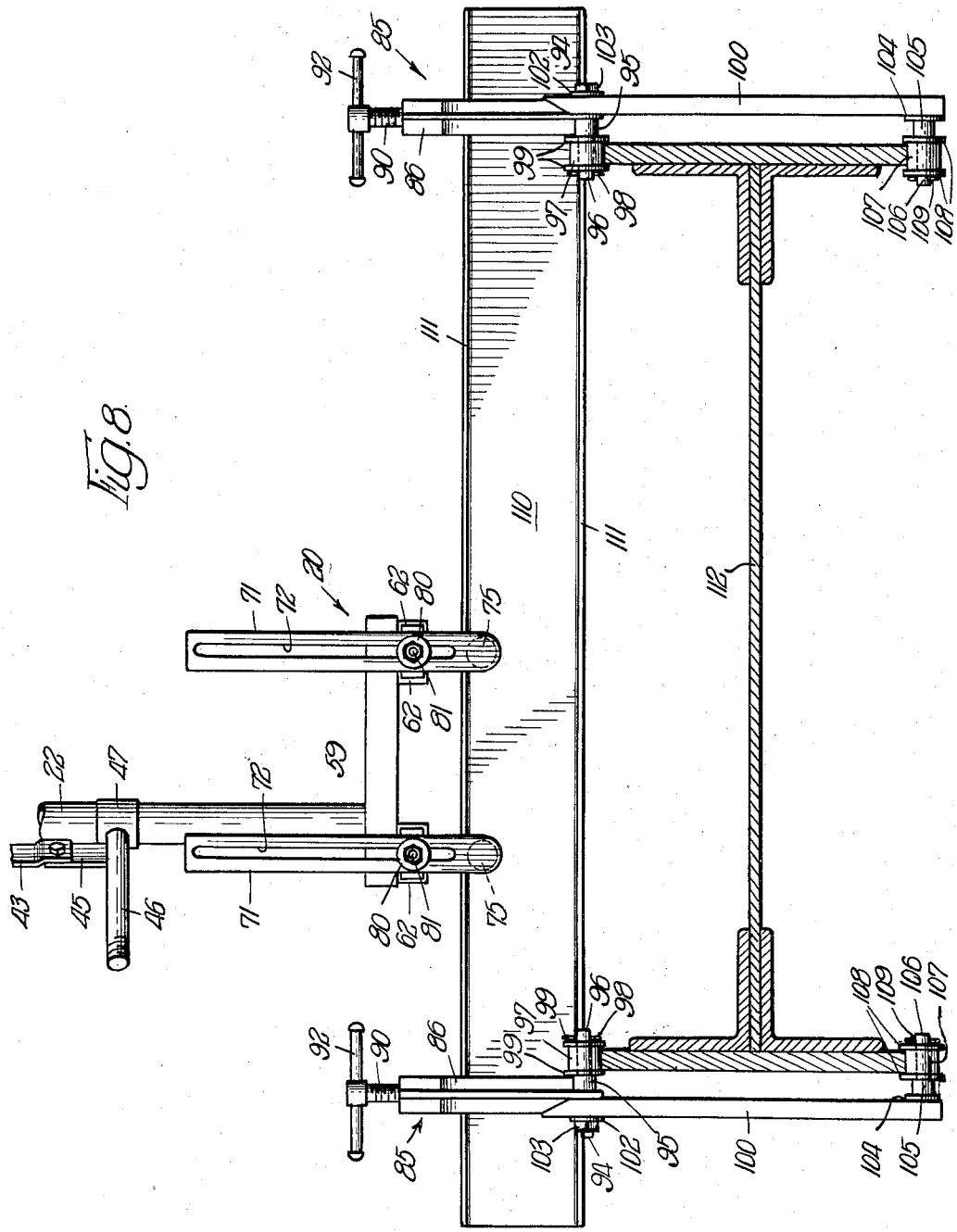

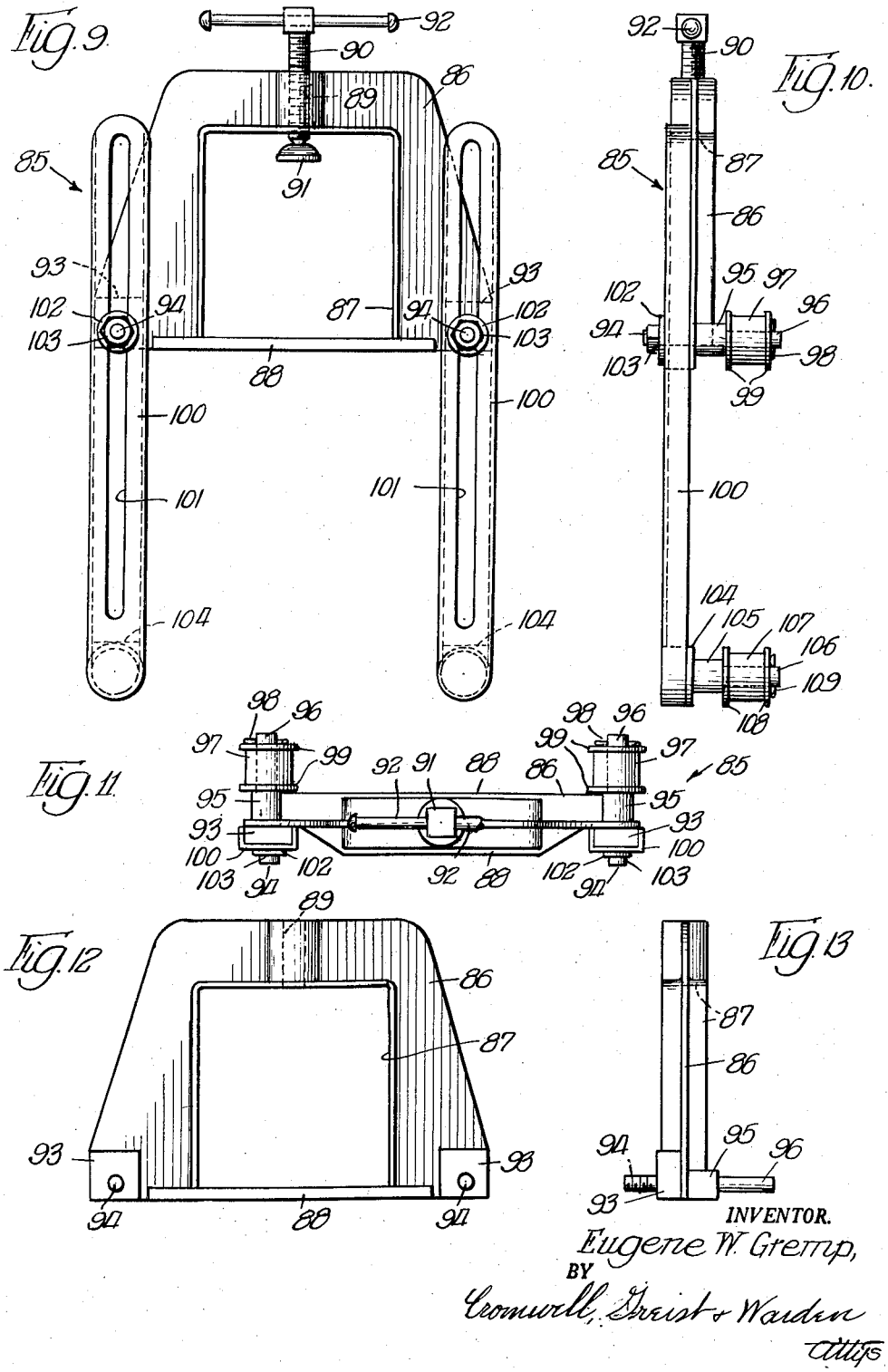

United States Patent Office 2,871,730
Patented Feb. 3, 1959

2,871,730

PORTABLE DRILL PRESS

Eugene W. Gremp, Chicago Heights, Ill.

Application August 31, 1955, Serial No. 531,707

8 Claims. (Cl. 77—13)

The present invention relates generally to a portable tool carrying device such as a drill press which is adapted for mounting on a workpiece for relative movement therebetween. More specifically, the present invention is directed to a tool carrying device including means which are engageable with a workpiece, which means cooperate with the tool to allow relative movement between the tool and the workpiece.

It is an object of the present invention to provide a portable tool carrying device for use with relatively large and bulky workpieces where it is desired to provide the workpiece with accurately spaced drilled holes or the like by a tool such as a drill which must, by necessity, be either moved relative to the workpiece or the workpiece moved relative to the tool.

A further object is to provide a portable drill press which has associated therewith means for engagement with a relatively large workpiece whereby the relative movement between the drill and the workpiece may be accomplished in an accurately controlled manner.

Other objects not specifically set forth will become apparent from the following detailed description of the present invention made in connection with the drawings wherein:

Fig. 2 is a side elevation of the assembled device of Fig. 1;

Fig. 3 is an end elevation of the device of Fig. 2;

Fig. 4 is a plan view of the device of Fig. 2;

Fig. 5 is a fragmentary end elevation illustrating the workpiece engaging portion of the device of Fig. 2 and its use in connection with one form of workpiece;

Fig. 6 is a fragmentray end elevation similar to Fig. 5 illustrating the use of the device in connection with a different form of workpiece;

Fig. 7 is a fragmentary end elevation similar to Fig. 5 and further illustrating the use of the device with still another form of workpiece;

Fig. 8 is a fragmentary side elevation illustrating the use of the device of Fig. 2 in connection with additional means for engaging a relatively wide workpiece;

Fig. 9 is an end elevation of the additional workpiece holding means of Fig. 8;

Fig. 10 is a side elevation of the workpiece holding means of Fig. 9;

Fig. 11 is a top plan view of the workpiece holding means of Fig. 9;

Fig. 12 is an elevation of an element of the workpiece holding means of Fig. 9; and Fig. 13 is a side elevation of the element shown in Fig. 12.

Figure 1:
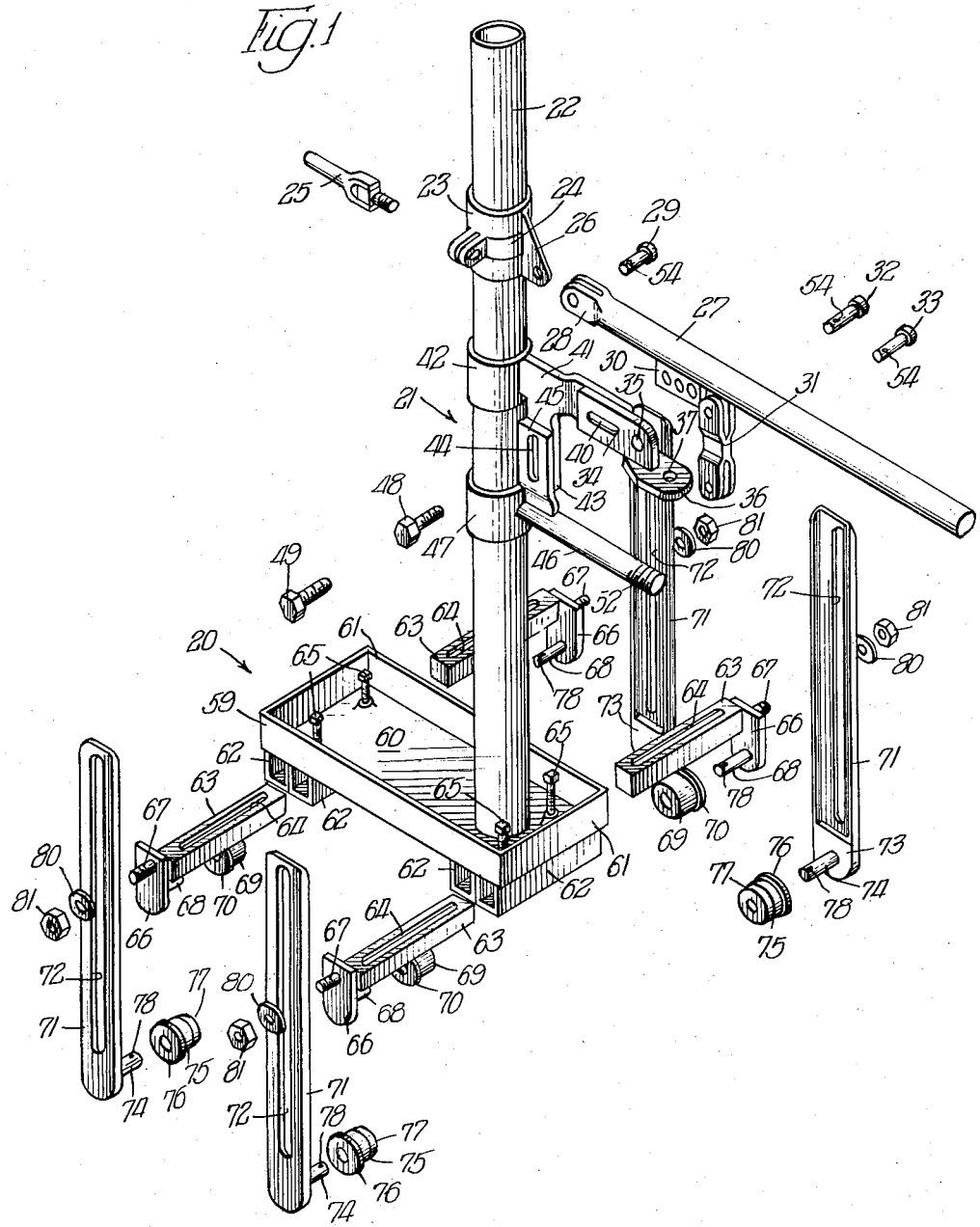
Fig. 1 is an exploded perspective view of a portable drill press incorporating the features of the present invention and having the drill removed therefrom to aid in clearly illustrating the various elements.

Referring to Figs 1–4 the portable drill press of the present invention includes a work holder assembly 20 and a drill press assembly 21. In the drill press assembly 21 a mounting post or column 22 supports near the top thereof a swinging collar 23 which includes a clamp collar 24 operated in the known manner by a locking bolt assembly 25. The swinging collar 23 includes a radially directed flange 26 to which is mounted a hand operated lever 27 by means of clevis 28 and a clevis pin 29. The lever 27 has mounted thereon a downwardly directed flange 30 which contains a series of spaced drilled holes adapted for cooperation with a clevis connecting link 31 which is attached at one end to the flange 30 by a clevis pin 32. The other end of the link 31 is suitably attached by a clevis pin 33 to a drill head adaptor 34 which contains a drilled hole 35 for receiving the clevis pin 33 therethrough. The drill head adaptor 34 includes a horizontal flange 36 containing a drilled hole 37 therethrough to receive a screw 38 (see Fig. 2) which clamps a drill 39 thereto. The drill head adaptor 34 further contains a longitudinal slot 40 which is aligned with a drilled hole in a horizontal flange 41, the latter flange being integrally connected to a collar 42 which is fitted to slide along the longitudinal axis of the column 22. The horizontal flange 41 is further provided with an integral downwardly extending vertical flange 43 which also contains a drilled hole adapted for alignment with a vertical slot 44 in a vertical flange 45. A body connector 46 integral with the flange 45 extends integrally from a collar 47 fitted about the column 22 for movement along its longitudinal axis. A bolt 48 is provided to be inserted through the slot 40 and the drilled hole in the horizontal flange 41 thereby attaching these elements in the manner shown in Fig. 2. An additional bolt 49 is adapted to be inserted through the vertical slot 44 and the drilled hole in the vertical flange 43 thereby attaching the latter flange with the vertical flange 45. The nut 50 is provided to retain the bolt 49 in its aforementioned position while the nut 51 retains the bolt 48 in its operative position. The slots 40 and 44 allow the flanges held by the bolts 48 and 49 to be adjusted with respect to one another. The outer end of the body connector 46 has applied thereto external threads 52 for insertion within a threaded recess 53 in the drill 39. The clevis pins 29, 32 and 33 are each provided with radially drilled holes 54 to receive cotter pins 55 therethrough. The drill 39 is of known design and consists generally of a body portion 56, handle 57 and drill stem 58.

The drill press assembly 21 is designed to be moved vertically with respect to column 22 and clamped by means of the locking bolt assembly 25 in any desirable position. By operation of the lever 27 the drill 38 may be moved downwardly into contact with the workpiece which is held in a manner to be described. The sliding fit of the collars 42 and 47 allows the drill mounting units 36 and 46 to move vertically with respect to the column 22 in response to operation of the lever 27. The provision of the slots 40 and 44 the drill head adaptor 34 and the vertical flange 45 respectively, as well as the plurality of drilled holes in the flange 30, allows the drill attaching unit including the horizontal flange 36 and the body connector 46 to be adjusted to receive different size drills.

The work holder assembly generally designated by the reference numeral 20 is associated with a bed or frame 59 which is formed with a bottom 60 and side walls 61. Attached to the outer surface of the bottom 60 are two sets of mandrel receivers 62, each set being positioned toward opposite ends of the frame 59. As shown in Fig. 1, each set of mandrel receivers 62 is composed of an inner and outer receiver, the outer receiver telescopically receives a mandrel or laterally extensible arm 63 from one side of the frame 59 while the inner receiver telescopically receives a mandrel or arm 63 from the other side of the frame 59. Each of the mandrels contains a slot 64 along the top surface thereof which receives a set screw 65 threadingly movable through the bottom 60 of the frame 59. Each set screw 65 passes through the slot 64 of its associated mandrel into engagement with the inner bottom surface of the mandrel to clamp the same with relation to its associated mandrel receiver 62. As a result the mandrels 63 may be extended laterally of the frame 59 to any desired extent and clamped into position by the use of their associated set screws 65. Each of the mandrels 63 is provided with radially extending flanges 66 integrally attached to the outer ends thereof, which flanges are positioned in offset relation to the central longitudinal axis of the mandrels. The offset relation of the flanges 66 to their respective mandrels 63 may be clearly seen in Figs. 2 and 4 and is provided to align opposite flanges. Each of the flanges 66 supports outwardly extending bolts 67 which are suitably threaded for a purpose to be described. The flanges 66 further contain inwardly directed pins 68 which are positioned below the mandrels 63. The pins 68 in turn support rollers 69 which are rotatable thereon. Each of the rollers 69 is provided with an annular flange 70.

The work holder 20 is further provided with a plurality of vertically movable arms 71, each of which contains longitudinal slots 72 along substantially the entire length thereof. Positioned directly below the longitudinal slots 72 at the bottom end of each of the vertical arms 71 are raised portions 73 which support inwardly directed pins 74. Rollers 75 are mounted on the pins 74 and are adapted to rotate with respect thereto. The rollers 75 are also provided with annular flanges 76 similarly as described in connection with the rollers 69. The rollers 75 are further provided with tapered annular shoulders 77 at the outer ends thereof. Each of the pins 68 and 74 is provided with a radially drilled hole 78 to receive a cotter pin 79 therethrough for the purpose of retaining its associated roller 69 or 75 thereon. The vertically movable arms 71 are generally U-shaped in cross section and are thereby adapted to internally receive the flanges 66 of the horizontal arms 63. By reason of this arrangement the bolts 67 pass through the slots 72 and their extending ends are provided with washers 80 and nuts 81 to clamp the vertical arms 71 to the horizontal arms 63.

The work holder assembly 20 is adapted to operate in the manner illustrated in Figs. 5–7. The horizontal arms 63 may be extended radially of the frame 59 to allow the vertical arms 71 to be spaced at a sufficient distance from one another to receive therebetween a workpiece. As shown in Fig. 5, a structural beam 82 of generally H-shaped cross section may be received between the vertical arms 71 and held therebetween by means of the rollers 69 and 75. The arms 71 are adjusted vertically with respect to the arms 63 by reason of the nuts 81 to space the rollers 69 and 75 sufficiently apart from one another to receive therebetween the side walls of the beam 82. The flanges 70 and 76 of the rollers 69 and 75 respectively alleviate contact between the side walls of the beam 82 and the sides of the arms 71 and as a result, the beam 82 and the work holder 20 with its associated drill press assembly 21 may be moved relative to one another upon rotation of the rollers 69 and 75 about their respective mounting pins. The tapered shoulders 77 of the rollers 75 aid in mounting the beam 82 with respect to the rollers by alleviating right angled outer edges on the rollers 75.

As can be seen in Figs. 6 and 7, the work holder unit 20 is readily adapted for receiving various shapes of workpieces such as the I-beam 83 of Fig. 6 and the L-beam 84 of Fig. 7. It is necessary merely to adjust the lateral extension of the horizontal arms 63 to the width of the particular workpiece being engaged. Following this, the vertical arms 71 are adjusted with respect to the horizontal arms 63 to engage flanged portions of the workpiece between the rollers 69 and 75.

In the operation of the work holder assembly 20 and drill press assembly 21, it is contemplated within the scope of the present invention to move the drill press assembly with respect to the workpiece or move the workpiece with respect to the drill press assembly. For example, the workpiece 82 of Fig. 5 may be suitably suspended and the combined work holder assembly 20 and drill press assembly 21 moved along the entire length thereof or the work holder assembly 20 and drill press assembly 21 may be properly supported to allow the workpiece 82 to be moved relative thereto. Similar arrangements can be made also with respect to the workpieces 83 and 84 of Figs. 6 and 7 respectively. Regardless of which arrangement is utilized it is possible in the use of the present invention to obtain relative movement between the drill press and a relatively large workpiece thereby conveniently and efficiently obtaining accurately spaced drilled holes in the workpiece. Furthermore, due to the particular manner in which the drill press engages the workpiece, little effort is required on the part of the operator in bringing about the relative movement.

In Fig. 8 the work holder and drill press combination previously described is shown in use with workpiece holders 85 in carrying out operations upon a relatively wide structural beam. The structure of the work holder 20 and drill press assembly 21 is the same as previously described in connection with Figs. 1–7, and in Fig. 8 the portions of this assembly shown have their elements identified by like reference numerals. In describing the structure of the workpiece holders 85 particular reference is made to Figs. 9–13.

The work holder 85 includes a frame 86 which is centrally apertured as indicated by the reference numeral 87. The central aperture 87 is bounded on the bottom thereof by laterally spaced bars 88 which serve to enclose the aperture 87 while at the same time reducing the weight of the holder 85. The frame 86 is generally U-shaped in cross section and contains centrally along the top portion thereof a threaded aperture 89 through which is advanced a clamping screw 90 having attached to the lower end thereof a clamp 91. The clamping screw 90 is provided at the upper end thereof with an operating handle 92 of known design. The side members of the U-shaped frame 86 expand laterally to form wide margins at the bottom portions thereof. One surface of each of these bottom margins is provided with a raised rectangular portion 93 from which extends centrally thereof in a radial direction a threaded arm 94. On the opposite side of the frame 86 are raised circular portions 95 extending outwardly thereof and which support centrally thereof pins 96. The pins 96 have mounted thereon rollers 97 by means of cotter pins 98. The rollers 97 are supplied at each of their ends with flanges 99. Generally U-shaped vertical movable arms 100 similar to those previously described receive the raised rectangular portions 93 of the frame 86 and further contain longitudinally extending slots 101 for receiving the threaded arms 94 therethrough. The vertical arms 100 are retained on the threaded arms 94 by means of washers 102 and nuts 103 and may be moved relative to the raised rectangular portions 93 by the loosening of the nuts 103 in a similar manner as previously described. The vertical arms 100 contain at the lower extremities thereof on the inner surfaces thereof raised sections 104 which support radially extending raised circular portions 105 as clearly shown in Fig. 10. Referring still to Fig. 10 the raised circular portions 105 support outwardly extending pins 106 which in turn receive rollers 107 thereon retainingly engaged by cotter pins 109. The rollers 107 are formed with flanges 108 at each of the ends thereof similarly as described in connection with rollers 97.

Referring now to Fig. 8 the workpiece holders 85 are illustrated in one form of their use in connection with the drill press unit of Figs. 1–7. The work holder 20 which supports the drill press assembly 21, only portions of which are shown in Fig. 8, is engaged as previously described with a support 110 which is illustrated as being a wide flange beam having horizontally extending flanges 111. The rollers 75 are positioned in contact with the lower surfaces of the upper flange 111 and the drill press assembly is adapted for movement longitudinally of the support 110. Positioned near each end of the support 110 is a workpiece holder 85 which includes the frame 86 which in turn receives the support 110 through its centrally located aperture. Directly below the support 110 and held at right angles thereto is a workpiece 112 which is illustrated in the form of a conventional channel beam of substantial width. The vertical arms 100 are extended sufficiently to receive the vertical sides of the beam 112 between the rollers 97 and 107. The flanges 99 and 108 on the rollers 97 and 107, respectively, serve to retain the vertical sides of the beam 112 in engagement with the rollers. In the particular installation illustrated in Fig. 8 the beam 112 or the entire drill mounting unit comprising the support 110 and work holders 85 may be moved relative to one another depending on which is supported in a stationary manner. Assuming that the beam 112 is capable of being moved with respect to the support 110 it can be readily seen that by reason of the mounting of the drill press assembly upon the support 110 the operator may move the press back and forth laterally of the beam 112 to provide the beam with accurately spaced drilled holes throughout the entire length and width thereof in an efficient and simple manner.

It can be readily seen from the foregoing description that work holders provided with adjustable flange-like elements in accordance with the teachings of the present invention are readily adapted for use with relatively large workpieces of varying shapes. While the work holders 20 and 85 and their particular structural features have been described in connection with a portable drill press it should be understood that any other type of portable tool may be used in combination with the work holders. It is contemplated within the scope of the present invention that any tool carrying device may be supplied with work holding elements capable of functioning similarly to those described in the embodiments disclosed in the drawings and such tool carrying devices, as a result, may be efficiently operated with many different sizes of workpieces of varying configurations. It should be further obvious that the flange-like elements positioned on the horizontal and vertical arms of the work holders need not necessarily be rollers similar to the type disclosed. Any suitable flange-like element capable of engaging a workpiece and allowing relative movement therebetween is contemplated for use within the scope of the present invention.

Obviously many modifications and variations of the invention as hereinbefore set forth may be made without departing from the spirit and scope thereof, and therefore only such limitations should be imposed as are indicated in the appended claims.

I claim:

1. A tool carrying device for mounting on a workpiece of a type such as I or L-beams for rolling movement therealong to relocate the tool without dismounting the same, said device including a frame carrying a tool thereon and having at least a pair of oppositely positioned lateral arms which extend radially outwardly from opposite sides of said frame, adjustment means fixing said lateral arms to said frame and permitting extension and retraction thereof relative to said frame to vary with the width of a workpiece, workpiece engaging elements carried by each of said lateral arms at the outer ends thereof for engaging opposite edge portions of a surface of a workpiece, a transversely directed arm attached by adjustment means to each of said lateral arms for movement relative thereto and said frame to vary with the depth of a workpiece, and workpiece engaging elements carried by each of said last named arms for fixed spaced and opposed positioning relative to said first named elements to grip therebetween edge surfaces of a workpiece on opposite sides or ends thereof, said elements being in the form of rollers for movement of said device along said edge surfaces.

2. A tool mounting arrangement for use with a continuous workpiece of substantial length and width, said arrangement including a tool carrying device mounted on a support beam for movement therealong, said beam being mounted on said workpiece transversely thereof for movement longitudinally therealong, said tool carrying device including adjustable pairs of roller carrying arms which engage spaced opposite edge surfaces of said beam to support said tool carrying device thereon for movement therealong, a pair of spaced workpiece holders carried by said beam and each including a centrally apertured frame receiving said beam therethrough, clamping means on each frame to fix the same in relation to said beam, laterally spaced arms on each frame each of which extend forwardly and rearwardly with respect thereto, vertical arms mounted on the rearward extensions of said laterally spaced arms, adjustment means forming a part of the mounting of said vertical arms to said laterally spaced arms and permitting vertical movement of said vertical arms relative to said laterally spaced arms, and separate flange-like elements carried by each of said arms, each of said laterally spaced arms having an element on the forward extension thereof, each of said vertically movable arms having an element carried at the lower extremity thereof, said elements including freely rotatable rollers cooperating therebetween to engage opposite surfaces of said workpiece to allow relative movement between said workpiece and said support beam carried by said frames.

3. A portable drill press for mounting on a structural beam type work object in any position from upright to inverted and for movement in the mounted position along said work object for periodic spaced drill press operation, said press as defined in an upright position including a horizontal frame mounting on the top thereof a vertically downwardly acting and transversely pivotable drill unit, a plurality of horizontal support arms carried by said frame and extending outwardly of opposite side margins thereof in spaced relation for support of said press on a work object, inwardly directed rollers carried by said horizontal support arms below the outermost ends thereof, each of said horizontal support arms carrying a vertical work object clamping arm at its outermost end, the lowermost end of each vertical clamping arm carrying an inwardly directed roller generally opposed to one of the first mentioned rollers, and adjustable clamping means attaching each vertical clamping arm to its support arm and permitting variable fixed positioning of each vertical clamping arm relative to its support arm to variably space each of the opposed rollers for movably mounting said press on different surface portions of a work object.

4. A portable drill press for mounting on a structural beam type work object in any position from upright to inverted and for movement in the mounted position along said work object for periodic spaced drill press operation, said press as defined in an upright position including a horizontal frame mounting on the top thereof a vertically downwardly acting and transversely pivotable drill unit, a plurality of horizontal support arms carried by said frame and extending outwardly of opposite side margins thereof in spaced relation for support of said press on a work object, inwardly directed rollers carried by said horizontal support arms below the outermost ends thereof, each of said horizontal support arms carrying a vertical work object clamping arm at its outermost end, the lowermost end of each vertical clamping arm carrying an inwardly directed roller generally opposed to one of the first mentioned rollers, and adjustable clamping means attaching each vertical clamping arm to its support arm and each support arm to said frame and permitting variable fixed positioning of said support arms toward and away from said frame and of each vertical clamping arm relative to its support arm to variably space each of the opposed rollers for movably mounting said press on different surface portions of a work object.

5. The press of claim 4 wherein said support arms are slidably mounted in separate housings carried on the bottom surface of said frame and said vertical clamping arms are longitudinally slotted receiving therethrough the adjustable clamping means attaching the clamping arms to the support arms.

6. The press of claim 4 wherein the rollers carried by said vertical clamping arms are tapered toward the innermost ends thereof.

7. A drill press mounting arrangement including a work object of substantial width, a tool support extending transversely of said work object in spaced relation thereto, each end of said tool support being received in spaced workpiece holders each of which includes a centrally apertured frame member carrying clamping means engaging said tool support, opposite end margins of each workpiece holder carrying rollers in spaced engagement with surface portions of said work object, paired arms carried by each workpiece holder and attached thereto by adjustment means permitting extension or retraction of said arms, the outermost extremities of each arm carrying a roller which is opposed in spaced relation with one of said first named rollers and which engages a surface portion of said work object to mount said tool support for movement along said work object, and a drill press mounted on said tool support for movement therealong transversely of said work object, said drill press including a plurality of opposed rollers in paired relation and in cooperative engagement with opposite marginal surface portions of said tool support.

8. A workpiece holder for use in a drill press mounting arrangement of the character described, said holder comprising an apertured frame member carrying an inwardly acting clamp to engage and hold an object received in said frame member, a pair of rollers mounted in spaced relation on opposite marginal portions of said frame member, outwardly projecting workpiece clamping arms carried by said frame member, the outermost end of each arm carrying a roller which is aligned with one of said first named rollers to engage opposite marginal surface portions of a work object therebetween to mount said holder on said work object for movement therealong, and adjustment means attaching each arm to said frame member and permitting extension and retraction of each arm to vary the spacing of said rollers.

References Cited in the file of this patent

UNITED STATES PATENTS

| | | |
|---|---|---|
| 287,866 | Sandiford | Nov. 6, 1883 |
| 1,247,341 | Skinner | Nov. 30, 1917 |
| 1,533,381 | Burton | Apr. 14, 1925 |

FOREIGN PATENTS

| | | |
|---|---|---|
| 158,482 | Germany | Feb. 16, 1905 |